July 17, 1928.
J. H. PRESSLEY
VACUUM TUBE CONTROL DEVICE
Filed July 27, 1926
1,677,727
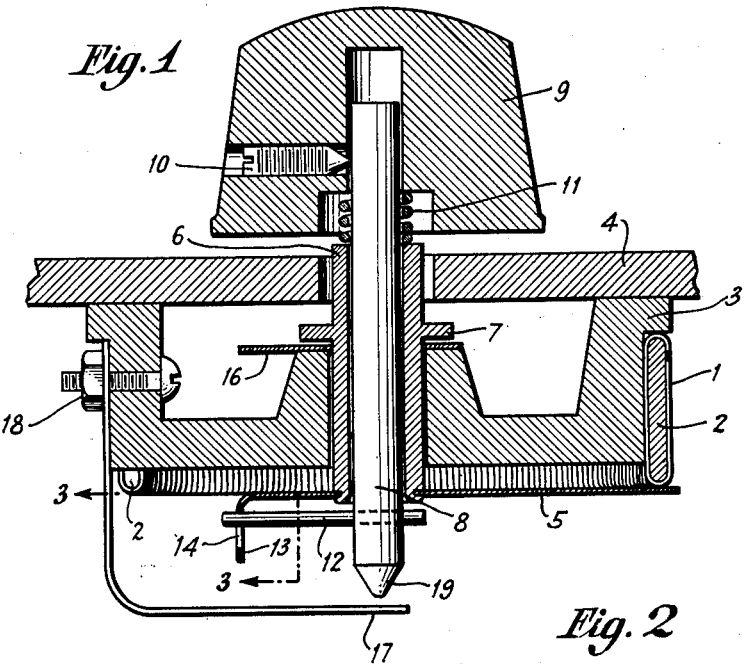
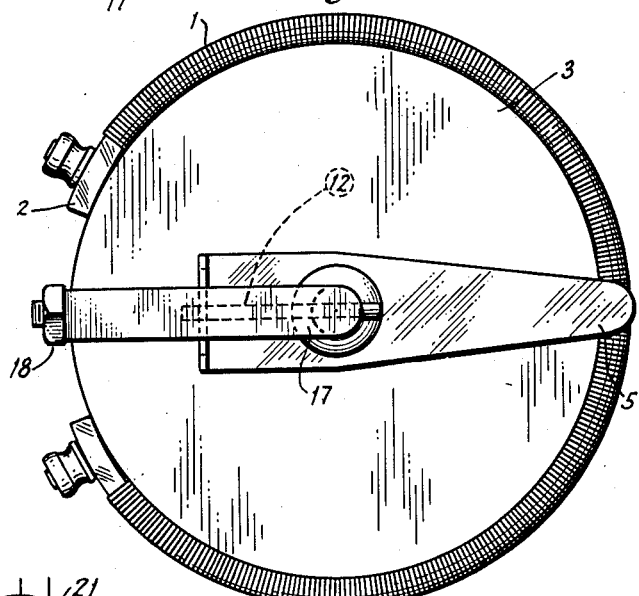
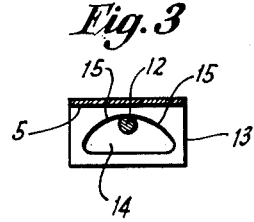
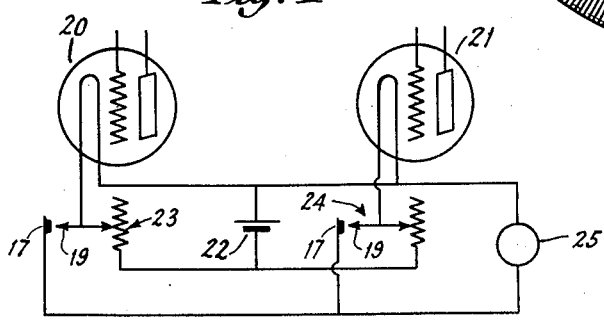
INVENTOR.
Jackson H. Pressley
BY
Bohleby & Ledbetter
ATTORNEYS.

Patented July 17, 1928.

1,677,727

UNITED STATES PATENT OFFICE.

JACKSON H. PRESSLEY, OF LONG BRANCH, NEW JERSEY.

VACUUM-TUBE-CONTROL DEVICE.

Application filed July 27, 1926. Serial No. 125,222.

This invention relates to apparatus for controlling the operation of thermionic relays and more particularly, thermionic relays of the type having a heated cathode adapted to emit electrons and having also an anode and a control electrode.

It is an object of this invention to provide apparatus for combining a measuring instrument with a thermionic relay in such a manner that normally said instrument is not in circuit but is however automatically connected in circuit to give an indication whenever the operator changes the operating conditions of the relays, and is disconnected again at the termination of the changing operation.

It is a further object of this invention to provide apparatus whereby one measuring instrument may be utilized with a plurality of groups of thermionic relays separately controlled in such manner that said measuring instrument is normally not in circuit but is automatically connected in circuit to give an indication with respect to any particular group of relays when the operator varies the operating conditions of said group, and disconnected again at the termination of the changing operation.

It is a further object of this invention to provide a variable resistance device adapted to control the heating current of a thermionic relay in such manner that a set of contacts which may be connected to a measuring instrument are normally open but are closed when said device is operated to vary the resistance in circuit with said relay and are opened again at the termination of the operation of the device.

It is still a further object of this invention to provide a filament rheostat which may be utilized as a switch to close and open a circuit to an indicating instrument as and when desired without varying the resistance in the filament circuit, and which will also operate automatically to close such circuit prior to variation of the resistance thereof and open said circuit at the termination of the operation of varying such resistance.

Still other objects of my invention will be apparent from the specification.

The features of novelty which I believe to be characteristic of my invention are pointed out with particularity in the appended claims. My invention itself however, both as to its fundamental principles and as to its practical embodiments, will best be understood by reference to the specification and accompanying drawing in which:

Figure 1 is a sectional view of a filament rheostat according to my invention;

Figure 2 an end view thereof;

Figure 3 a detail section on lines 3—3 of Figure 1 showing the shaft pin and cam surfaces therefor, and Figure 4 is a circuit diagram illustrating the embodiment of my invention in a circuit comprising a plurality of groups of thermionic relays.

In accordance with my invention I provide a variable resistance device such for example as a coil wound with resistance wire and adapted to be traversed by an arm so as to include more or less of the resistance coil in circuit as desired. I also provide an operating means such as a shaft having a knob for driving the said arm to vary the resistance included in circuit. Instead of mounting the arm directly upon the shaft as is usually the case in such devices, I mount the arm upon a separate operating member such as a sleeve encircling the operating shaft and I arrange the operating shaft for rotation and also for axial movement or translation. I provide suitable means for maintaining said shaft at one extremity of its axial movement and I also provide a contact which may be closed by the shaft when at the other extremity of its axial movement. Furthermore, I provide a lost motion and cam connection which not only allows the shaft to be moved axially from one extremity to the other extremity of its movement to close said contact without affecting the amount of resistance included in circuit, but which also operates upon rotation of the shaft to cause axial movement thereof to close said contacts prior to movement of the arm for varying the resistance included in the circuit, and causes the contacts to be opened when the operator releases his hold on the shaft operating means.

Referring now more particularly to Figure 1, 1 designates a resistance wire which may be wound in the form of a coil upon a core 2 as is usual in the art and which coil may be formed into the arc of a circle and secured in position upon a suitable base 3 such for example as moulded bakelite. The device may be secured or mounted upon a suitable support or panel 4 in such manner as to permit the major portion of the device to be on one side of the panel 4 while the operating means extends through and projects from the opposite side thereof.

5 designates an arm, preferably a flat strip of resilient metal adapted to be rotated in contact with one edge of the coil of resistance wire, in a manner to vary the amount of resistance in circuit. Arm 5 is preferably conductively secured to sleeve 6 provided with flange 7 for a purpose to be described later. The main operating shaft 8 is arranged for rotation and translation within sleeve 6 and carries at its outer end a suitable operating knob 9 held in place by any suitable means such for example as set screw 10. Knob 9 is preferably counterbored and spring 11 arranged to encircle shaft 8 in such manner as to press against knob 9 and the outer end of sleeve 6 so as to maintain shaft 8 at the outward extremity of its movement. Sleeve 6 is prevented from moving inwardly and simultaneously an electrical contact is made therewith by the action of the contacting strip 16 which is electrically connected to a suitable terminal, not shown.

Shaft 8 is provided with a pin 12 projecting therethrough, while arm 5 is provided with a downwardly turned extremity 13 provided with an opening 14 adapted to permit pin 12 to extend therethrough. The inner edges of the opening 14 are formed to provide cam surfaces 15 whereas the outer edge is preferably not so formed as will be seen from Figure 3. A suitable contact 17 shown as an L shaped arm is secured by binding post 18 and extends outwardly over the center of shaft 8 in such manner that tapered contact point 19 of shaft 8 makes contact therewith before shaft 8 reaches its inward extremity of movement.

From what has already been said it will be understood that the operating shaft 8 may be pressed inwardly to make contact between point 19 and arm 17 by simply pressing upon knob 9 and thereby deforming spring 11. It will likewise be understood that when this pressure is released the spring 11 will return the shaft 8 to the outward extremity of its movement, thereby breaking the contact between point 19 and arm 17. It will also be understood that if it is desired to vary the amount of resistance included in circuit the shaft 8 will be rotated by grasping knob 9 and turning it. Arm 5 will not immediately be rotated by reason of the lost motion between arm 12 and opening 14 in the end portion 13 of arm 5, but as the shaft 8 is rotated the outer extremity of pin 12 will pass along one of the cam surfaces 15 and shaft 8 will be forced inwardly against the tension of spring 11 and at some point before reaching the extremity of its movement will make contact between point 19 and arm 17. Further rotation of the shaft in the same direction will carry pin 12 to the extremity of opening 14 and rotation beyond to this point will rotate the arm 5 to vary the amount of resistance included in circuit, it being understood that during such rotation of the arm 5 the contact between point 19 and arm 17 is maintained closed. At the end of the desired movement, release of the operating knob 9 permits the spring 11 to force shaft 8 outwardly and pin 12 slides along cam surface 15 thereby slightly rotating the shaft to return it substantially to a position where pin 12 takes the position shown in Figure 3.

It will be understood that the strength of spring 11 must be coordinated with the friction met with in operation so that spring 11 will deform and permit shaft 11 to move inwardly and make the desired contact before arm 5 is moved on wire 1.

Turning now to the operation of a circuit in accordance with my invention, 20 and 21 designate groups of thermionic relays having a pair of filament terminals; 22 is a suitable source of current for heating said filaments; 23 and 24 are variable resistance devices according to my invention such as just described and 25 is a suitable measuring instrument such, for example as a voltmeter adapted to indicate the potential difference between the filament terminals of either of the groups of relays. It will be understood that by pressing the operating knob of variable resistance device 23 as already described a circuit will be closed by the closure of point 19 against arm 17 connecting the indicating device 25 directly across the filament terminals of the group of relays 20, thereby enabling the operator to determine whether or not said relays are operating as desired. Similarly a pressure upon the operating knob of variable resistance device 24 will enable the same determination to be made of group of relays 21. Also, if it is desired to vary the filament current of the group of relays 20 rotation of the operating knob will cause the indicating instrument 25 to be connected across the filament terminals of this group of terminals to indicate the voltage thereon at all times while the resistance is being varied. At the termination of the varying operation the circuit will be opened as already described and similarly operation of the device 24 to vary the filament current of the group of relays 21 will cause a circuit to be closed between the indicating instrument 25 and the filament terminals of the group of relays 21 which circuit will be interrupted at the termination of the varying operation.

While I have shown and described the preferred embodiments of my invention it will be understood that modifications and changes may be made as will be apparent to those skilled in the art without departing from the spirit and scope of my invention. For example, instead of closing contact 19 against contact 17, contact 17 may be operated by an insulating tip on shaft 8 and forced into contact with still another contact, or a plurality of contacts may be provided as in the multiple jack well known in the art.

Also, it will be understood that while I have referred to measuring and indicating the potential difference across the filament terminals of the relays the potential difference across any of the relay terminals may likewise be measured or the potential difference between different set of terminals may be measured simultaneously by the provision of more indicating instruments; for example, the filament and plate voltage on the amplifiers may be measured. Also it will be understood that while I have referred to groups of relays 20 and 21 these groups may if desired comprise only a single relay or as many as may be desired.

What I claim is:

1. A variable resistance device for controlling the filament current of a thermionic relay comprising a resistance, an arm movable thereon to vary the resistance in circuit, an operating shaft mounted for rotation to drive said arm and for axial movement to close a pair of contacts, and means comprising a cam surface for effecting axial movement of said shaft to close said contacts before causing movement of said arm, when said shaft is rotated.

2. A variable resistance device for controlling the filament current of a thermionic relay, comprising a resistance winding, an arm movable thereon to vary the resistance in circuit, an operating shaft mounted for rotation to drive said arm and for axial movement to close a pair of contacts, a sleeve mounted for rotation concentric with said shaft, and having said arm secured thereto, a lost motion connection between said shaft and said arm and comprising a cam surface arranged to move said shaft axially to close said pair of contacts before rotating said arm, when said shaft is rotated.

3. A variable resistance device for controlling the filament current of a thermionic relay, comprising a resistance winding formed into an arc, an arm rotatable thereon to vary the resistance in circuit, an operating shaft mounted concentrically with said arc for rotation to drive said arm, and for axial movement to close a pair of contacts, a sleeve mounted for rotation concentric with said shaft, and having said arm secured thereto, a projection carried by said arm, and extending parallel to said shaft, and having an opening formed therein having a cam surface, a pin in said shaft projecting into said opening, and yieldable means for maintaining said shaft normally at one end of its axial movement to keep said contacts open, whereby rotation of said shaft to vary said resistance causes axial movement thereof to close said contacts before rotation of said arm to vary said resistance.

4. A variable resistance device for controlling the filament current of a thermionic relay comprising a resistance winding, an arm rotatable thereon to vary the resistance in circuit, an operating shaft mounted for rotation to drive said arm and for axial movement to close a pair of contacts, a sleeve mounted for rotation about said shaft, and having said arm secured thereto, a projection carried by said arm and extending parallel to said shaft, and having an opening formed therein having a cam surface on one side thereof only, a pin in said shaft projecting into said opening, and resilient means for biasing said shaft in a direction to maintain said contacts open.

In testimony whereof I affix my signature.

JACKSON H. PRESSLEY.